Patented Oct. 21, 1952

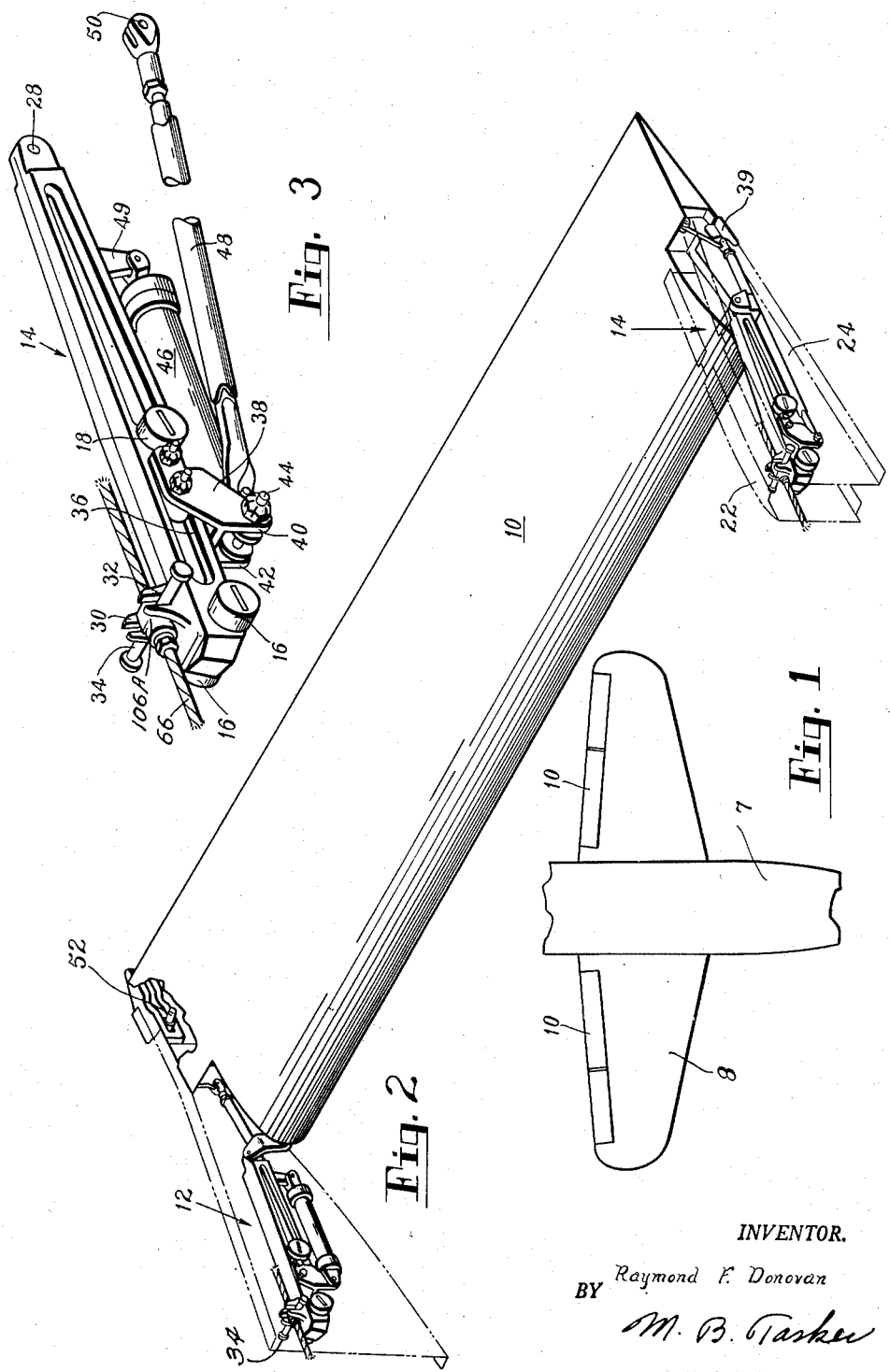

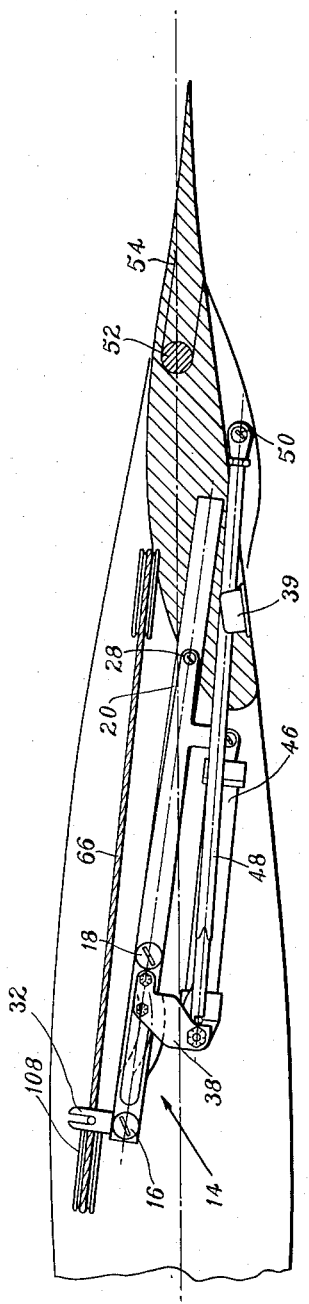
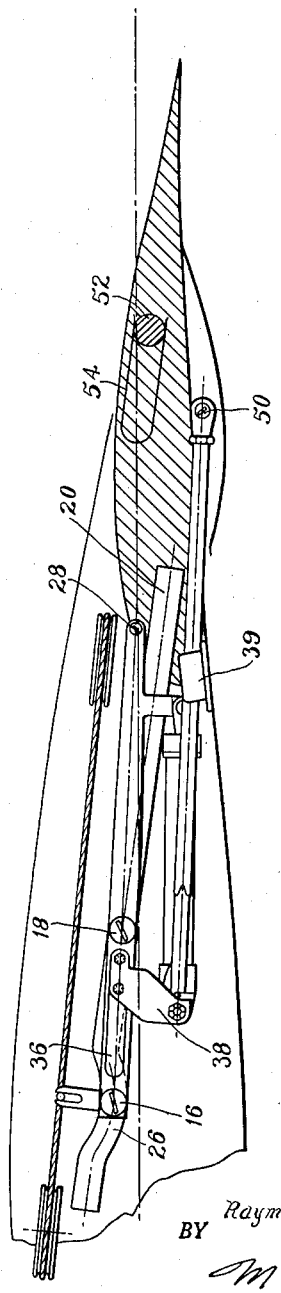

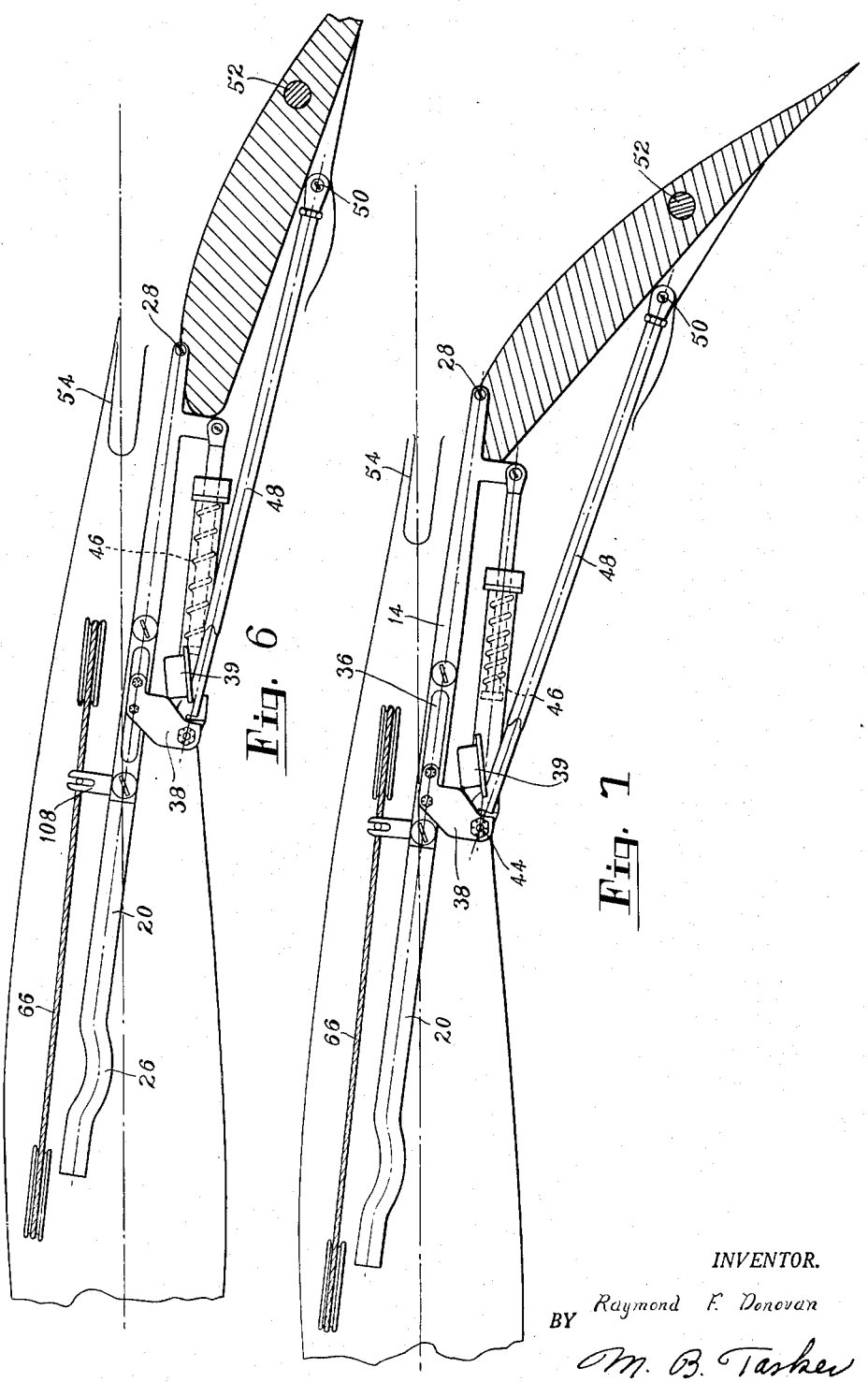

2,614,774

UNITED STATES PATENT OFFICE 2,614,774

FLAP MECHANISM

Raymond F. Donovan, Dallas, Tex., assignor to United Aircraft Corporation, East Hartford, Conn., a corporation of Delaware Application December 31, 1948, Serial No. 68,633

2 Claims. (Cl. 244—43)

This invention relates to movable aircraft surfaces and particularly to improvements in auxiliary airfoils or flaps.

In present day high performance aircraft, it is vital that all movable surfaces and their operating mechanisms be absolutely dependable, simple in construction and operation, and compact and clean in design. In addition to the above requirements, new aerodynamic loading problems must be considered in that the flaps must greatly reduce air speeds for safer landings and must provide considerably more lift to insure adequate lift for take-off and cruise conditions. With the modern design of high speed airfoils and their greatly increased areodynamic loading, movable airfoils such as flaps must be structurally adequate.

Therefore, it is an object of this invention to provide an auxiliary airfoil or flap in conjunction with a main aircraft lifting surface for efficiently varying the area, chord and camber of the main lifting surface.

Another object of this invention is to provide an improved aircraft flap mechanism which insures positive control of the flap for intermediate positions in its operative range.

Another object of this invention is to provide an extensible flap which can withstand extremely high aerodynamic loads in its cruise or partially extended and deflected position as a result of having the flap rigidly supported at its trailing edge by the main wing.

Another object of this invention is to provide actuating and controlling mechanisms which are completely housed within the main wing so that protrusions from the main wing are eliminated.

These and other objects will become apparent from the following detailed description of the accompanying drawings wherein one embodiment of the invention is illustrated.

In these drawings:

Fig. 1 is a partial plan view of an airplane and main wing including the flaps of this invention;

Fig. 2 is a perspective view of the flap and extending mechanism;

Fig. 3 is a detailed perspective view of the flap extending mechanism;

Fig. 4 is a profile view of the flap and accompanying mechanism with the flap in the fully retracted position;

Fig. 5 is similar to Fig. 4 indicating the cruising or partially extended position of the flap;

Fig. 6 is similar to Fig. 5 indicating the take-off position of the flap while Fig. 7 shows the flap fully extended.

Figure 8:
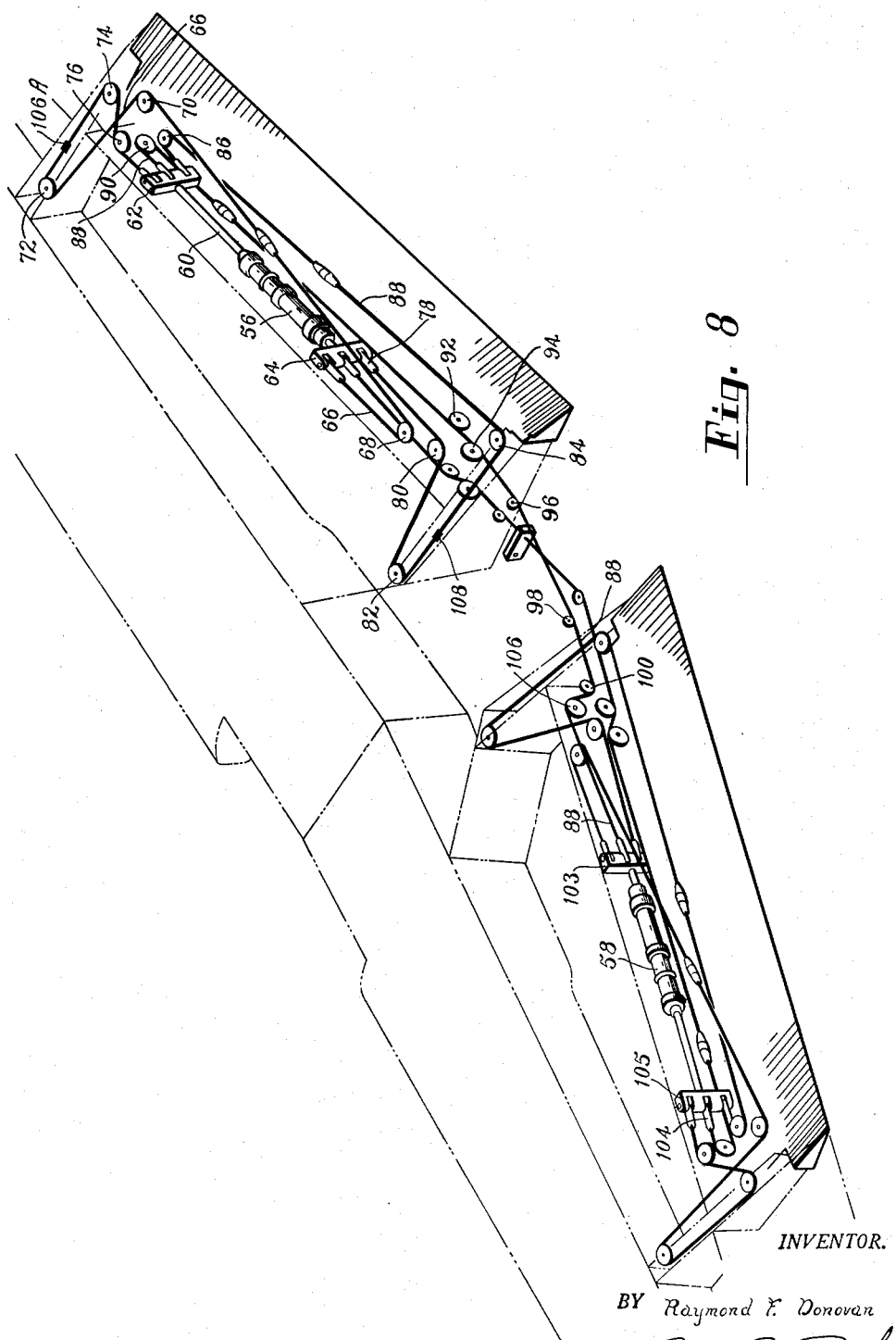
Fig. 8 is a perspective view showing the cable actuating system for the flap extending mechanism.

In Fig. 1 the airplane fuselage 7 carries a main wing 8 which includes a pair of flaps 10 disposed on each side of the fuselage.

As shown most clearly in Fig. 2, each flap 10 is located between and carried by a pair of truck assemblies 12 and 14 each of which has a pair of front rollers 16 and a pair of rear rollers 18 which slidably engage dual wing tracks 20 (Fig. 4); only one of the tracks being shown in Figs. 4–7 for convenience of illustration. The track 20 is located between wing ribs 22 and 24 (shown in phantom in Fig. 2) and as seen more clearly in Fig. 6, the track 20 has a slight joggle 26 at its forward end but otherwise it is essentially a straight track housed within the wing proper and slopes downwardly toward the rear.

The truck 14 has fore and aft connections; the aft end being secured adjacent the leading edge of the flap 10 at the point 28. Two pairs of upstanding ears 30 and 32 are integrally formed on the forward end of the truck 14 and a cable carried cross pin 34 is secured thereto to provide an actuating connection for the truck. The main body portion of truck 14 has therein an internal track 36 in which a carriage 38 is adapted to move in a limited fore and aft direction. The carriage 38 has two furcations 40 and 42 and a connecting bolt 44 therein for supporting one end of a spring strut 46 and a radius rod 48. The other end of the spring strut 46 is attached to a depending flange 49 on the aft end of the truck 14 while the other end of radius rod 48 is pivotally connected to the lower surface of the flap at a point aft of the latter's mid-chord location.

As can be seen most clearly in Fig. 2, the flap 10 has a stud 52 located near its trailing edge for cooperation with a channel 54 in the main wing. The stud serves as an aft support for the flap for its cruise position of extension since under these conditions the aircraft will be flying at relatively high speeds and high aerodynamic loads will be imposed thereon. In this manner relatively thin airfoils can be made structurally adequate for high speeds.

Fig. 8 illustrates the cable and actuating system of this invention. In this view actuating struts 56 and 58 are located in a spanwise position near the trailing edge of the main wing just forward of their respective movable flaps 10. The extension or compression of struts 56 and 58 imparts movement to the flaps. Only the movements of the right-hand strut will be described as the movements of strut 56 and 58 are identical and are so interconnected that either one can extend both flaps simultaneously. The strut 56 includes a through piston rod 60 which carries at its free ends the triple yokes 62 and 64. The uppermost connection of yoke 64 has a cable 66 attached thereto which rides over pulleys 68, 70, 72, 74, 76 and is attached to the uppermost connection of yoke 62 thereby forming a closed cable system in the right wing. The lowermost connection of yoke 64 has a cable 78 attached thereto which rides over pulleys 80, 82, 84 and 86 and is connected to the lowermost connection of yoke 62. A cable 88 runs from the center connection of outboard yoke 62 over pulleys 90, 92, 94, 96, 98, 100 and 106 to the center connection of the inboard yoke 103 in the left-hand wing. Cable 104 makes a similar connection from the yoke 105 in the left wing to the right wing thereby interconnecting the right and left flap actuating systems. This interconnection insures simultaneous operation of both flaps in the event of failure of either strut 56 or strut 58.

Cables 66 and 78 each carry the dogs 106A and 108, respectively, which in turn support a cross pin connection 34 as seen most clearly in Fig. 3.

Thus it can be seen that when rod 60 of strut 56 moves to the right the yokes 62 and 64 are pulled to the right, thereby moving dogs 106 and 108 simultaneously in a forward direction, thereby applying uniform motion to the wing trucks 14 and causing movement of flap 10.

It is, of course, desirable and necessary to move the right flap and the left flap simultaneously. Accordingly, the crossed cables 88 and 104 synchronize the flap movements and, in the event of failure of either actuating strut, the remaining operative strut can operate both flaps.

The flaps normally have four basic positions as shown on Figs. 4, 5, 6 and 7. Fig. 4 shows the flap in its completely retracted or "full up" position. In this position of the flap it is apparent that the upstanding ears 32 of the dog 108 are in the extreme forward position and the truck 14 is in a fully forward position in wing track 20, while carriage 38 is in the aft position in truck track 36; the carriage 38 being biased in this position by spring strut 46. At the same time the stud 52 is engaged with the forward end of channel 54. This 0° deflected position of flap 10 provides a rigidly carried airfoil and high speed aerodynamic forces are satisfactorily counteracted since the flap is firmly supported at its forward and aft ends by wing carried structure.

Fig. 5 indicates the position of the flap and mechanism in the 4° deflected or cruising position. This small deflection is accomplished as the front pair of rollers 16 move into the lower portion of joggle 26, thereby causing flap 10 to rotate slightly about point 28 of truck 14 and point 50. Stud 52 on flap 10 moves to the end of channel 54 but is still maintained in slot 54 to give additional support to the flap when the airplane is cruising at moderately high speeds. Channel 54 and track 14 are parallel; accordingly, the outward downward extension of the flap is due to the slope of the track 14 and slot 54 in relation to the wing. However, beyond this cruise position the flap is extended substantially in linear relation to the wing until the full extension position is approached at which time the flap is pivoted downwardly in a manner to be described hereinafter. However, the carriage 38 up to the point of downward pivotation of the flap is held in the aft end of the truck track 36, being maintained in that position by the pre-loaded spring strut 46.

When the flap is moved from the up position to the cruising position, the trucks in the inboard and outboard wing rib tracks move aft approximately 3.6 inches. The curved portion or joggle of the wing rib tracks 20 causes the forward end of the truck to move downward and the aft end of the truck to move upward, thus causing the forward portion of the flap to move upward and rotate the aft portion of the flap downward 4 degrees such that the upper surface of the flap remains in contact with the wing upper trailing edge. It is obvious, then, that the upper cambered surface will remain in juxtaposition with the upper wing surface trailing edge so that no gap will exist between the wing and flap during the relatively high speed cruise condition. The flap stud 52 remains within its channel 54 for the cruising position in order to provide a large torsional support arm for the flap for the relatively high speed (approx. 350 M. P. H.). This special cruising position is provided to keep the airfoil within the low drag regime when carrying additional weight such as auxiliary fuel tanks or bombs.

In Fig. 6, a profile view is shown of the flap in a partially deflected (approx. 27½°) or take-off position wherein the flap has reached its maximum aft travel and begins to be deflected downwardly. Although it has been determined that this amount of flap deflection provides an adequate lift increase for take-off for certain types of thin airfoils now being used, the optimum position will vary with different airfoils and the illustration herein is made for convenient description. In this position of the flap the truck 14 has moved aft in the wing track 20 while the stud 52 has moved completely out of channel 54 and the flap is now supported by truck 14 at point 28 and by radius rod 48 at point 50. The carriage 38 by this time abuts a stop 39 in the wing track 20, thereby maintaining carriage 38 and radius rod 48 stationary in relation to the truck 14 and causing the flap 10 to rotate about the relatively fixed pivot point 50. The relative movement between the truck 14 and the carriage 38, it is apparent, must be made against the bias of spring strut 46 which at this time is being compressed.

As seen in Fig. 7 the flap 10 is in its fully (50°) deflected position. In this position truck 14 has been moved to its full aft position, and inasmuch as the aft movement of carriage 38 has been stopped by the abutments 39, carriage 38 is forced to the forward end of truck track 36, thereby causing flap 10 to rotate downwardly to its fully deflected position. It should be noted that as the flap is fully deflected by rotation about point 50 it is also necessary that a certain amount of pivotal freedom is afforded to the radius rod 48 about the bolt 44 to prevent an overstress of the flap mechanism which would result from the sloping aft movement of truck 14.

When the flap is moved from the cruising position to the take-off position, the trucks on the inboard and outboard wing rib tracks move aft approximately 90% of their full travel. When the trucks have moved back 80% of their full travel, the carriage comes up against a stoplock 39 at both the inboard and outboard tracks. The carriage then stops, and the truck moves past the carriage while the radius rod rotates somewhat around the bolt 44 due to rotational motion of the flap. During the motion from cruising position to take-off position, the spring strut, because of its preloading, keeps the carriage in a fixed position against its stop relative to the truck; also, air loads acting upon the flap cause it to tend to "trail" thereby loading the carriage against its stop in the truck.

When the flap is moved from the take-off position to the landing position, the carriage remains against the stop 39, and the trucks in the inboard and outboard wing rib tracks move aft relative to the carriage. The aft movement of the truck causes the flap to rotate since the end of the radius rod is restrained from translational movement.

The spring strut between the carriage and the truck has sufficient preloading to overcome the hinge moment tending to deflect the flap due to the dead weight of the flap such that when the flaps are checked for operation on the ground, without air loads acting thereon, the flap will always be in a determinate position.

As a result of this invention it is apparent that an improved flap mechanism has been provided whereby the flap can be partially extended in a relatively horizontal plane for intermediate flight conditions while the flap can be downwardly deflected toward the end of its aft movement to provide adequate drag in landing.

Further as a result of this invention an improved flap mechanism has been provided which permits a partial flap extension for high speed cruise conditions while adequately supporting the flap so that the high air loads accompanying such flight conditions can be withstood. Also during such high speed cruising the upper cambered surface of the flap is maintained in close contact with the upper wing surface thereby providing a continuous streamlined surface having higher lifting qualities without a large increase in drag.

Although only one embodiment of this invention has been illustrated and described herein, it is apparent that various modifications and changes can be made in the arrangement of the parts without departing from the scope of this novel concept.

What it is desired by Letters Patent is:

1. In an aircraft, a main wing, an extensible flap, means for mounting said flap on said wing, mechanism in said wing for extending said flap substantially horizontally in relation to said wing, said mechanism comprising a track carried in a fore and aft position in said wing, a truck having fore and aft rollers engaging said track and having a pivotal connection to the forward end of said flap and having a fore and aft slot, and a carriage slidable within said slot and including a rigid extension member connected to said flap at a point remote from said pivotal connection, biasing means comprising a spring loaded strut one end of which is connected to said truck and the other end connected to said carriage for normally maintaining said carriage in the aft portion of said slot, means for guiding said flap during its initial aft movement including a channel in said wing open at its aft end and a stud on said flap cooperating with said channel, means for imparting a slight deflection to said flap during its initial movement while said stud is engaged in said channel including a joggle in the forward portion of said track whereby said extension member and said pivotal connection are displaced when said forward roller moves into said joggle, and means for increasing the deflection of said flap relative to said wing when said stud moves out of the open end of said channel including a stop on said wing engageable by said carriage for overcoming said biasing means.

2. In an aircraft having a main wing, a pair of extensible flaps disposed on either side of the longitudinal centerline of said main wing beneath the trailing edge thereof, means for mounting said flaps on said wing, mechanism in said wing for extending each of said flaps substantially horizontally in relation to said wing, said mechanism comprising a track carried in a fore and aft position in said wing, a truck having fore and aft rollers engaging said track and having a pivotal connection to the forward end of said flap and having a fore and aft slot, and a carriage slidable within said slot and including a rigid extension member connected to said flap at a point remote from said pivotal connection, biasing means comprising a spring loaded strut one end of which is connected to said truck and the other end connected to said carriage for normally maintaining said carriage in the aft portion of said slot, means for guiding said flap during its initial aft movement including a channel in said wing open at its aft end and a stud on said flap cooperating with said channel, means for imparting a slight deflection to said flap during its initial movement while said stud is engaged in said channel including a joggle in the forward portion of said track whereby said extension member and said pivotal connection are displaced when said forward roller moves into said joggle, means for increasing the deflection of said flap relative to said wing when said stud moves out of the open end of said channel including a stop on said wing engageable by said carriage for overcoming said biasing means, actuating means operatively connected to each of said flaps, and means for interconnecting said actuating means to move both flaps by either of said actuating means.

RAYMOND F. DONOVAN.

REFERENCES CITED

The following references are of record in the file of this patent:

UNITED STATES PATENTS

| Number | Name | Date |
|---|---|---|
| 2,137,879 | Ksoll | Nov. 22, 1938 |
| 2,207,453 | Blume | July 9, 1940 |
| 2,222,435 | Ksoll | Nov. 19, 1940 |
| 2,235,146 | Fowler | March 18, 1941 |
| 2,352,062 | Zap | June 20, 1944 |
| 2,376,636 | Thompson | May 22, 1945 |
| 2,379,274 | Boyd | June 26, 1945 |
| 2,423,984 | Knoll | July 15, 1947 |
| 2,426,785 | Naumann | Sept. 2, 1947 |

FOREIGN PATENTS

| Number | Country | Date |
|---|---|---|
| 417,898 | Great Britain | Oct. 15, 1934 |
| 454,556 | Great Britain | Sept. 28, 1936 |